(No Model.)
T. DE C. RUTH.
FLUE CUTTER.
No. 572,570. Patented Dec. 8, 1896.
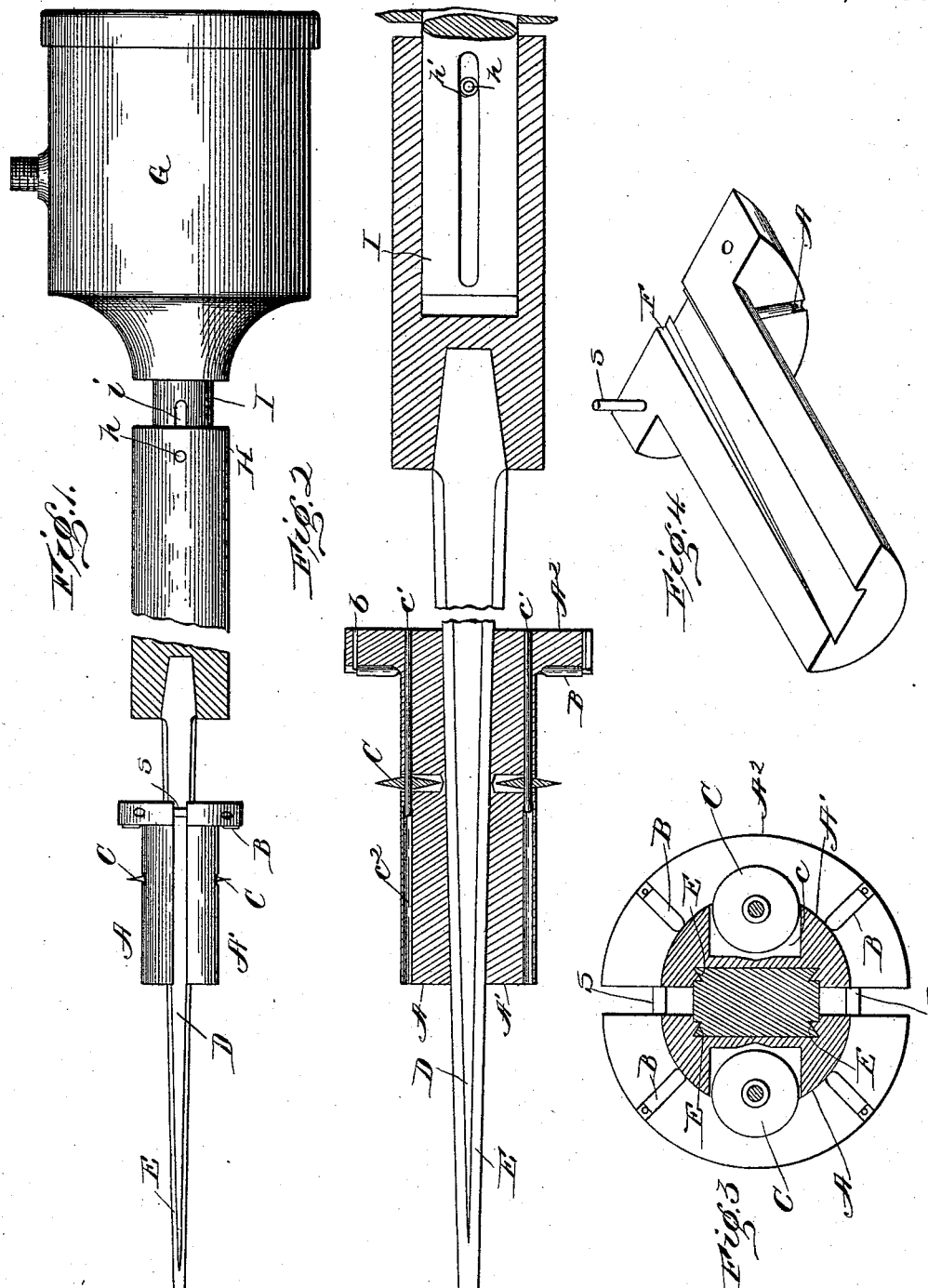
Witnesses:
J. M. Fowler Jr.
Alex. Stewart
Inventor:
Thomas De C. Ruth,
by Church & Church
his Attorneys.

UNITED STATES PATENT OFFICE.

THOMAS DE COURSEY RUTH, OF BUFFALO, NEW YORK.

FLUE-CUTTER.

SPECIFICATION forming part of Letters Patent No. 572,570, dated December 8, 1896.

Application filed April 14, 1896. Serial No. 587,527. (No model.)

*To all whom it may concern:*

Be it known that I, THOMAS DE COURSEY RUTH, of Buffalo, in the county of Erie, State of New York, have invented certain new and useful Improvements in Flue-Cutters; and I do hereby declare the following to be a full, clear, and exact description of the same, reference being had to the accompanying drawings, forming a part of this specification, and the letters of reference marked thereon.

This invention has for its object, primarily, to provide a simple, powerful, and efficient cutter for cutting the flues in a locomotive or other boiler, and, secondly, to provide a means for operating said cutter both to rotate the cutting-points or cutters proper and to expand the same to increase the depth of the cut.

The cutting mechanism proper in the present invention consists of a sectional body portion connected to move together in a longitudinal direction and capable of being expanded laterally, such body portion being mounted upon a relatively long wedge or incline having dovetails on each side, whereby the sections of the body are moved positively out and in to expand or contract the diameter of such body portion, the said body portion having relatively long bearings on the wedge in order to resist the strains incident to turning the cutter or body portion when inserted in the flue, thus reducing strain on the dovetails. The driving mechanism for the tool consists of a motor of any approved pattern capable of being manually supported and connected with the tool, so as to rotate the same, and capable of a limited independent longitudinal movement, whereby the motor may be used as a hammer or driver for forcing the wedge inwardly to expand the body of the cutter.

Referring to the accompanying drawings, Figure 1 is a side elevation of a flue-cutter and driving mechanism constructed in accordance with my present invention, and Fig. 2 is a sectional view through the same with portions shown broken away and in elevation in order that those portions in section may be shown on an enlarged scale. Fig. 3 is a transverse section through the body of the cutter, showing the connection between the sections of said body and the wedge, together with the cutting-rollers and rollers for reducing friction against the body of the flue. Fig. 4 is a perspective view of one of the halves of the body of the cutter, showing the dovetail recess and bearing-surfaces for the coöperation of the wedge.

Like letters of reference in the several figures indicate the same parts.

A A' indicate the sections, preferably halves, of a cylindrical body portion made of proper diameter to fit within the end of the flue or tube which is to be severed, said body-sections being provided at one end with a flange $A^2$, adapted to form a stop for seating against the end of the tube or flue, and in order to reduce friction at this point I preferably mount in said flange a series of radially-arranged rollers B. These rollers are simply dropped into radial holes cutting the face of the flange, so that one side of the roller will project through said face and be held in place by a pin or pins $b$ inserted in the flange at the outer ends of the roller.

The cutters proper, which in the present instance are shown in the form of rollers C, work in recesses $c$ in the circumference of the body portion, and are journaled on pins $c'$ in holes drilled through the body portions or sections from end to end and having one end enlarged, as shown at $c^2$ in Fig. 2. Thus if the pin becomes broken at any time it is a simple matter to drive it farther into the opening and so provide a new bearing for the roller, the broken piece being ejected into the larger portion of the bore, from which it may be dropped by turning the tool on end. Running longitudinally through the meeting faces of the body-sections I form a rectangular slot with a very gradual taper from one end to the other, the taper of said slot corresponding exactly to the taper of the wedge D, upon which the body of the cutter is mounted, and should be so gradual as that no amount of lateral pressure on the cutters or sections will move the wedge outward and but a very slight pressure is necessary to drive the wedge in and expand the sections or cutters with great power. By making the aperture and wedge rectangular in cross-section I provide wide smooth bearing-surfaces well calculated to resist lateral pressure both in expanding the sections and in turning the tool by means of power applied to the wedge, and in order that the body-sections may be moved positively outward and inward I form dovetail projections or corresponding recesses and projections in the body-sections and edges of the wedge, respectively, as shown at E. Such dovetail recesses and projections are preferably relatively small, and outside of them I form on the sections bearing-shoulders F, Fig. 4, which shoulders operate to relieve the strain on the dovetail sections in rotating the tool and greatly assist in overcoming wear on the dovetail recesses and projections.

In order to rotate the tool, I preferably connect it directly with a small motor, such as a rotary engine, as shown and lettered G, or any small portable motor, which may be manually supported, if so desired, and, further, in order that the tool may be rotated and the wedge driven in at the same time, I form a loose connection between the motor and wedge, so that the motor itself may be operated as a hammer for tapping the wedge in as the cutting proceeds. For this purpose the end of the wedge is connected to a holder or sleeve H, into which the motor-shaft I projects, the connection between the motor-shaft I and sleeve H being formed, preferably, by a pin and slot $h$ $i$, which will permit the motor and its shaft to be withdrawn for a limited distance and again forced in until the motor-casing strikes the end of the sleeve and will operate as a hammer for forcing the wedge inwardly. Any ordinary or preferred form of connection which will insure the simultaneous rotation of the parts while permitting a limited longitudinal movement will answer for that shown; but I prefer the pin-and-slot connection, inasmuch as with this form of connection an antifriction-roller $h'$ may be mounted on the pin, whereby the power necessary to move the motor longitudinally while the tool is being rotated is greatly reduced.

In operation, it will be understood, the body of the cutter is moved out to the point of the wedge and inserted in the flue until the flange strikes the bead or end of the flue, when the wedge is forced in until the cutters come in contact with the inner circumference of the flue. The motor is then started, the cutter-body rotated, and the wedge simultaneously driven in by slight blows or taps on the rear end. The taper of the wedge is so gradual that it is not forced out by the lateral pressure on the cutters, and at the same time a very slight blow is necessary in order to force the cutters into the metal to sever the tube. When the tube has been severed, it is only necessary to draw the wedge out, when the body or sections of the body are positively brought together and the cutters moved out of the cut for permitting the tool to be removed for subsequent use, the body-sections being meanwhile held against independent longitudinal movement by the transverse pins S.

Having thus described my invention, what I claim as new is—

1. In a flue-cutter, the combination with the sectional body carrying the cutters and having the tapered, rectangular opening therethrough, with dovetail recesses and projections extending longitudinally of said rectangular opening, of the relatively long wedge, rectangular in cross-section, and having dovetail recesses and projections corresponding to the recesses and projections in the sectional body; substantially as described.

2. In a flue-cutter the combination with the cylindrical sectional body portion having the flange at one end, and cutters mounted in the cylindrical face of said body portion, with a rectangular aperture formed in the meeting faces of the sections and dovetail recesses and projections arranged longitudinally in said aperture, of the wedge rectangular in cross-section fitting in said aperture and having corresponding dovetail recesses and projections for holding the sections of the body together and bearing-shoulders on the sections and wedge respectively adjacent their meeting surfaces; substantially as described.

3. In a flue-cutter the combination with the cylindrical sectional body portion and wedge connecting the sections by means of dovetail recesses or projections as described, of the flange on the sectional body portion having radial antifriction-rollers mounted in its inner face; substantially as described.

4. The combination with the rotary cutter, of the motor connected for simultaneous rotation with said cutter and having a limited longitudinal movement, whereby said motor may be employed as a hammer for advancing the cutter; substantially as described.

5. The combination with the rotary expansible cutter for cutting laterally and the wedge for expanding said cutter, of the motor connected with said wedge for rotating the cutter and having a limited longitudinal movement with bearing-shoulders interposed between the motor and wedge whereby the motor may be employed as a hammer for advancing the wedge and expanding the cutter; substantially as described.

6. The combination with the rotary cutter, the wedge for expanding the same, the sleeve connected with said wedge and the motor, of a motor-shaft for rotating the sleeve and a pin-and-slot connection between the motor-shaft and sleeve, with shoulders interposed between said parts whereby the motor may be given a limited longitudinal movement and be operated as a hammer while rotating the sleeve; substantially as described.

THOMAS DE COURSEY RUTH.

Witnesses:
   THOS. KENT BRADFORD,
   A. W. BRADFORD,
   WALTER S. TREW.